United States Patent
Lopez Mendez et al.

(10) Patent No.: US 11,398,048 B2
(45) Date of Patent: Jul. 26, 2022

(54) ESTIMATING CAMERA POSE

(71) Applicants: Apical Limited, Cambridge (GB); Arm Limited, Cambridge (GB)

(72) Inventors: Roberto Lopez Mendez, Cambridge (GB); Daren Croxford, Swaffham Prior (GB); Mina Ivanova Dimova, Great Shelford (GB); Mohamed Nour Nader Fathy Abouelseoud, Cambridge (GB)

(73) Assignees: Apical Limited, Cambridge (GB); Arm Limited, Cambridge (GB)

( * ) Notice: Subject to any disclaimer, the term of this patent is extended or adjusted under 35 U.S.C. 154(b) by 182 days.

(21) Appl. No.: 16/943,859

(22) Filed: Jul. 30, 2020

(65) Prior Publication Data

US 2022/0036577 A1 Feb. 3, 2022

(51) Int. Cl.
*G06T 7/70* (2017.01)
*G06T 7/593* (2017.01)
*G06N 3/04* (2006.01)
*G06N 3/08* (2006.01)

(52) U.S. Cl.
CPC ............ *G06T 7/70* (2017.01); *G06N 3/0454* (2013.01); *G06N 3/08* (2013.01); *G06T 7/593* (2017.01); *G06T 2207/10012* (2013.01); *G06T 2207/10016* (2013.01); *G06T 2207/20081* (2013.01); *G06T 2207/20084* (2013.01); *G06T 2207/30244* (2013.01)

(58) Field of Classification Search
CPC .................... G06N 3/0454; G06N 3/08; G06T 2207/10012; G06T 2207/10016; G06T 2207/20081; G06T 2207/20084; G06T 2207/30244; G06T 7/593; G06T 7/70
See application file for complete search history.

(56) References Cited

U.S. PATENT DOCUMENTS

| | | | |
|---|---|---|---|
| 10,262,224 B1* | 4/2019 | Harguess | G06V 20/00 |
| 11,144,117 B1* | 10/2021 | Choudhuri | G02B 27/01 |
| 11,181,925 B2* | 11/2021 | Haeusler | G05D 1/0272 |
| 11,252,329 B1* | 2/2022 | Cier | G06Q 50/08 |
| 2018/0293756 A1* | 10/2018 | Liu | G01P 15/0802 |

(Continued)

OTHER PUBLICATIONS

Casser et al., "Depth Prediction Without the Sensors: Leveraging Structure for Unsupervised Learning from Monocular Videos", Institute for Applied Computational Science, Harvard University; University of Texas at Austin; Nov. 15, 2018.

*Primary Examiner* — Bobbak Safaipour
(74) *Attorney, Agent, or Firm* — EIP US LLP

(57) ABSTRACT

A system for estimating a current camera pose corresponding to a current point in time using a previous camera pose corresponding to a previous point in time, of a camera configured to generate a sequence of image frames. The system performs operations, including: generating, using one or more neural networks, a neural network pose prediction for the current image frame; and adjusting a previous camera pose using inertial measurement unit data representing a motion of the camera between the previous point in time and the current point in time, to provide an inertial measurement unit pose prediction for the current point in time. The inertial measurement unit pose prediction, and the neural network pose prediction are combined in order to estimate the current camera pose.

20 Claims, 4 Drawing Sheets

(56) References Cited

U.S. PATENT DOCUMENTS

| | | | | |
|---|---|---|---|---|
| 2019/0096081 A1* | 3/2019 | Gupta | .................. | G06T 5/00 |
| 2019/0251696 A1* | 8/2019 | Wang | .................. | G06T 7/292 |
| 2019/0371024 A1* | 12/2019 | Wisely Babu | ....... | G06V 30/194 |
| 2020/0013188 A1* | 1/2020 | Nakashima | ............ | G06N 20/00 |
| 2020/0357136 A1* | 11/2020 | Qiao | .................. | G06T 7/73 |
| 2021/0055409 A1* | 2/2021 | Croxford | .............. | G01S 13/887 |
| 2021/0183094 A1* | 6/2021 | Son | .................. | G06V 20/10 |
| 2021/0279472 A1* | 9/2021 | Chuang | ................ | G06V 40/16 |
| 2021/0321035 A1* | 10/2021 | Sherrah | ................ | A43D 1/025 |
| 2021/0358197 A1* | 11/2021 | Shysheya | ............. | G06T 15/205 |
| 2022/0066207 A1* | 3/2022 | Croxford | .............. | H04R 1/326 |

* cited by examiner

ESTIMATING CAMERA POSE

BACKGROUND OF THE INVENTION

Field of the Invention

The present disclosure relates to a system for estimating a camera pose, i.e. a position and orientation of the camera in a three-dimensional space. A related computer-implemented method, and a non-transitory computer-readable storage medium are also disclosed.

Description of the Related Technology

Many electronic systems incorporate a camera. For example, cameras have been incorporated into vehicles, robots, drones, augmented reality "AR" systems such as AR headsets and glasses, personal computers such as tablets and laptops, and mobile communication systems such as mobile telephones and "smart" phones. In many of these systems, the camera may be employed in tracking or navigation applications. To this end, various techniques from the fields of computer/machine vision, virtual/augmented reality "VR" or "AR" have been developed to process camera images. For example, Visual Odometry "VO" and Simultaneous Localization and Mapping "SLAM" are often used in order to navigate within an environment.

VO is a technique in which camera images are used to estimate changes in position in a three-dimensional space. VO may be "feature-based" or "direct". Feature-based VO involves determining corresponding feature points in the camera images and determining a spatial transformation that maps the images to one another. By contrast, direct VO involves determining a transformation that maps image intensities between the images "directly", obviating the need to identify features. In Visual inertial odometry "VIO", inertial measurement unit "IMU" data is used to augment VO by compensating for camera motion.

SLAM is a technique for performing localization in an unknown environment whilst simultaneously constructing a map of the environment. In visual SLAM, the camera is tracked by aligning camera images, for instance using feature-based or direct VO. SLAM is typically performed by aligning 2D camera images. In some SLAM solutions, techniques such as Time of Flight, Structured Light and stereo cameras use additional sensors to generate depth maps that are used to align the camera images. Visual inertial SLAM is yet another SLAM technique which employs an inertial measurement unit to compensate for camera motion.

As may be appreciated, the computational requirements of estimating a camera pose are significant. Thus, there is a need to provide improvements to the estimation of a camera pose.

SUMMARY

According to one aspect of the disclosure, a system is provided for estimating a current camera pose corresponding to a current point in time using a previous camera pose corresponding to a previous point in time, of a camera configured to generate a sequence of image frames. The system includes:
one or more processors; and
one or more non-transitory computer-readable storage media that collectively store instructions that, when executed by the one or more processors cause the system to perform operations, comprising:
receiving one or more image frames from the sequence of image frames, including a current image frame corresponding to the current point in time;
receiving inertial measurement unit data representing a motion of the camera between the previous point in time and the current point in time;
receiving the previous camera pose;
inputting the one or more image frames to one or more neural networks, and generating, using the one or more neural networks, a neural network pose prediction for the current image frame;
adjusting the previous camera pose using the inertial measurement unit data representing a motion of the camera between the previous point in time and the current point in time, to provide an inertial measurement unit pose prediction for the current point in time; and
combining the inertial measurement unit pose prediction for the current point in time, and the neural network pose prediction for the current image frame, to estimate the current camera pose.

Another aspect of the present disclosure relates to using a non-linear filter to combine the inertial measurement unit pose prediction, and the neural network pose prediction. Other aspects of the present disclosure relate to the neural network, and to training the neural network. A computer-implemented method, and a non-transitory computer-readable storage medium are provided in accordance with other aspects of the disclosure. The functionality disclosed in relation to the system may also be implemented in the computer-implemented method and in the non-transitory computer-readable storage medium in a corresponding manner.

Further features and advantages of the disclosure will become apparent from the following description of preferred examples of the disclosure, given by way of example only, which is made with reference to the accompanying drawings.

DETAILED DESCRIPTION OF CERTAIN INVENTIVE EMBODIMENTS

Examples of the present application are provided with reference to the following description and the figures. In this description, for the purposes of explanation, numerous specific details of certain examples are set forth. Reference in the specification to an "example" or similar language means that a feature, structure, or characteristic described in connection with the example is included in at least that one example. It is also to be appreciated that features described in relation to one example may also be used in another example and that all features are not necessarily duplicated for the sake of brevity. For instance, features described in relation to the system may also be used in the computer-implemented method, and in the non-transitory computer-readable storage medium, and in the computer program product in a corresponding manner.

Figure 1:
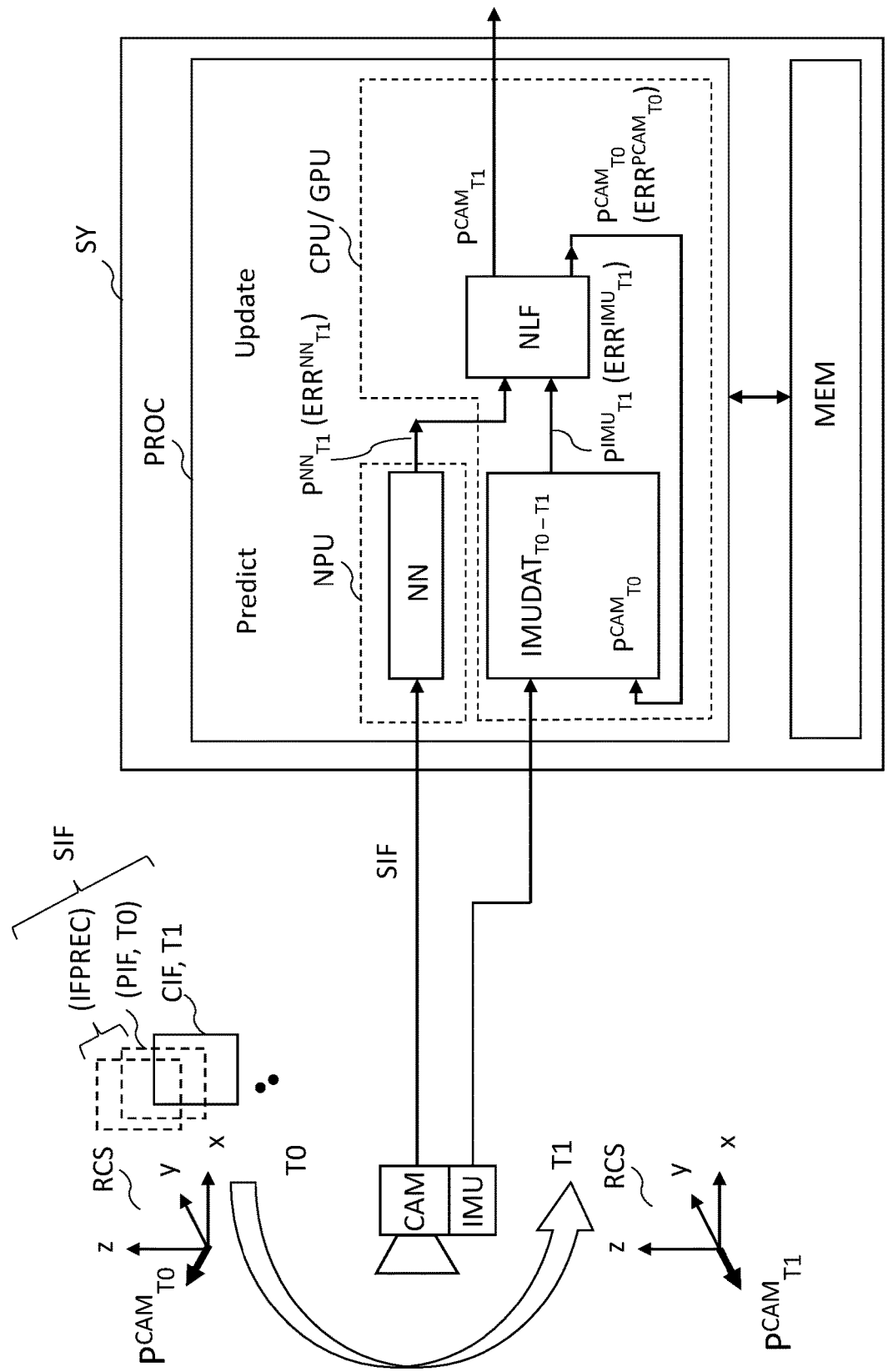
FIG. 1 illustrates a schematic diagram that includes an example system SY for estimating a current camera pose $P^{CAM}_{T1}$ of a camera CAM, together with a camera CAM and an inertial measurement unit IMU.

FIG. 1 illustrates a schematic diagram that includes an example system SY for estimating a current camera pose $P^{CAM}_{T1}$ of a camera CAM, together with a camera CAM and an inertial measurement unit IMU. The example system SY in FIG. 1 includes one or more processors PROC and one or more non-transitory computer-readable storage media MEM. The processor(s) PROC are in communication with the non-transitory computer-readable storage media MEM as indicated by the arrows therebetween in FIG. 1. The system SY may be used to estimate a current camera pose $P^{CAM}_{T1}$ of the camera CAM. The current camera pose $P^{CAM}_{T1}$ corresponds to a current point in time T1, and is estimated using a previous camera pose $P^{CAM}_{T0}$ that is also estimated by the system SY and fed-back into system SY. The previous camera pose $P^{CAM}_{T0}$ corresponds to a previous point in time T0. The camera CAM generates a sequence of image frames SIF. The non-transitory computer-readable storage media MEM collectively store instructions that, when executed by the one or more processors PROC cause the system SY to perform operations, comprising:

receiving one or more image frames from the sequence of image frames SIF, including a current image frame CIF corresponding to the current point in time T1;
  receiving inertial measurement unit data $IMUDAT_{T0-T1}$ representing a motion of the camera CAM between the previous point in time T0 and the current point in time T1;
  receiving the previous camera pose $P^{CAM}_{T0}$;
  inputting the one or more image frames to one or more neural networks NN, and generating, using the one or more neural networks NN, a neural network pose prediction $P^{NN}_{T1}$ for the current image frame CIF;
  adjusting the previous camera pose $P^{CAM}_{T0}$ using the inertial measurement unit data $IMUDAT_{T0-T1}$ representing a motion of the camera between the previous point in time T0 and the current point in time T1, to provide an inertial measurement unit pose prediction $P^{IMU}_{T1}$ for the current point in time T1; and
  combining the inertial measurement unit pose prediction $P^{IMU}_{T1}$ for the current point in time T1, and the neural network pose prediction $P^{NN}_{T1}$ for the current image frame CIF, to estimate the current camera pose $P^{CAM}_{T1}$.

In some examples, the camera pose that is estimated by the system SY may be used to perform tracking or navigation. System SY may for example be used to perform tracking or navigation in vehicles, robots, drones, AR systems such as AR headsets and glasses, personal computers such as tablets and laptops, and mobile communication systems such as mobile telephones and "smart" phones. In another example, the camera pose may be used in a virtual reality system in order to accurately place a virtual object in an environment.

Examples of the system SY that employ a neural network to estimate the camera pose may offer improvements including reduced power consumption, and a faster estimation of camera pose. The camera pose may be estimated more quickly due to the direct estimation of the camera pose prediction by the neural network. In particular, using a neural network to estimate the camera pose prediction significantly reduces the post-processing requirements of computing the camera pose later in the processing pipeline. Using a neural network to directly estimate the camera pose prediction drastically reduces the number of equations that need to be solved when the camera pose changes and needs to be updated. Examples of the system SY that estimate the camera pose by combining the inertial measurement unit data IMUDAT with the predicted pose may offer improvements including improved accuracy and a more robust estimation of camera pose.

Camera CAM in FIG. 1 may be any type of camera capable of generating images. In some examples, camera CAM generates digital images. In some examples, camera CAM employs a global shutter, whereas in other examples camera CAM employs a rolling shutter. In some examples, camera CAM is a monocular camera, whereas in other examples, camera CAM is a binocular camera. The use of a camera CAM that includes one, two, or more than two optical elements is therefore contemplated. Camera CAM may be sensitive to one or more portions of the electromagnetic spectrum, such as for example visible wavelengths, infrared wavelengths, ultraviolet wavelengths, and so forth. In one example, camera CAM is sensitive to visible light and generates image frames encoded in red, green and blue colour channels, i.e. an RGB colour space. In other examples, camera CAM generate image frames encoded in other colour spaces such as CMYK, or in grayscale.

In general, camera CAM in FIG. 1 is movable within a reference coordinate system RCS. The reference coordinate system RCS in FIG. 1 may be any coordinate system that allows a pose to be represented. The coordinate system may be a local coordinate system, or a geographic coordinate system, or a mixed-type coordinate system that incorporates aspects of both types of coordinate systems. A local coordinate system allows the camera pose to be specified relative to a reference position and orientation. The reference position may be an arbitrary position, such as a reference marker on a building, a position on a floor or a wall, etc. The reference orientation may be an arbitrary orientation, such as looking towards a particular object, etc. Examples of local coordinate systems include the spherical coordinate system and the cartesian coordinate system, each of which allow a position to be specified with respect to three orthogonal axes, typically i or X, j or Y, and k or Z. A pose may be specified in these coordinate systems as a vector with respect to the orthogonal axes. Another example of a local coordinate system is the cartesian six degrees of freedom notation wherein a position may be specified with respect to each of three orthogonal axes, and an orientation may be specified in terms of a rotation about each of the three orthogonal axes. The orientation may for example be represented by a quaternion. A geographic coordinate system allows positions within a particular geographic space, such as the earth, to be expressed with the same notation. Examples of geographic coordinate systems include the World Geodetic System of 1984 "WGS84" and the North American Datum of 1983 "NAD83" that allow the specification of a position in terms of latitude and longitude on a global scale, and which are used by Global Positioning Systems, i.e. "GPS". In such geographic coordinate systems the position may include a specification of the height above the earth's surface. An orientation may also be represented by a bearing with respect to the earth's magnetic field, i.e. the "azimuth", together with an angle with respect to the horizon, i.e. the "altitude" or "elevation above the horizon". The pose relative to a geographic coordinate system is also known as the "geopose".

The inertial measurement unit IMU in FIG. 1 is held in a fixed spatial relationship with the camera CAM. In other words, the inertial measurement unit IMU is rigidly mechanically coupled to camera CAM. The inertial measurement unit IMU may include one or more accelerometers and/or one or more gyroscopes that generate data representing the respective motion. Inertial measurement unit IMU may alternatively or additionally include one more magnetometers. A magnetometer provides orientation data in the form of a direction with respect to the earth's magnetic field within a horizontal plane. In one example, inertial measurement unit IMU includes three orthogonally-mounted accelerometers and three orthogonally-mounted gyroscopes that are arranged to provide data representing motion in six degrees of freedom. In other examples, fewer accelerometers or gyroscopes may be used. Thus, as camera CAM moves within reference coordinate system RCS, the rigidly mechanically coupled inertial measurement unit IMU generates inertial measurement unit data. More specifically, the inertial measurement unit data represents a motion of the camera CAM respective the reference coordinate system RCS.

The inertial measurement unit data from the accelerometer(s) and/or gyroscope(s) may be processed by means of an integration process in order to determine a change in position and/or orientation of camera CAM. For example, a change in position along a particular axis may be determined by performing a double integration over time of an accelerometer's linear acceleration data along that axis. A change in rotational angle about a particular axis of rotation may be determined by performing a single integration over time of a gyroscope's angular velocity data about that axis. Thus, by processing the inertial measurement data in this manner, it may be used determine a motion of camera CAM over time. As described below, system SY uses the inertial measurement unit data as well as image frames from camera CAM in order to estimate a pose of camera CAM. Examples that estimate the camera pose in this manner may help to compensate for low accuracy inertial measurement unit data.

As illustrated in FIG. 1, camera CAM generates a sequence of image frames SIF. The sequence of image frames SIF may be a sequence of video image frames, or a sequence of still image frames. The sequence of image frames SIF includes a current image frame CIF that is generated by camera CAM at a current point in time T1. The sequence of image frames SIF may also include one or more preceding image frames IFPREC that precede the current image frame CIF, such as a previous image frame PIF corresponding to the previous point in time T0. The image frames IFPREC, PIF, CIF may be consecutive image frames or there may be one or more image frames between these image frames. Camera CAM may also generate additional image frames to those mentioned above and illustrated in FIG. 1, such as subsequent image frames that are subsequent to the current image frame CIF. Additional image frames may be generated by interpolating between image frames in the sequence of image frames generated by camera CAM.

The inertial measurement unit data generated by inertial measurement unit IMU represents a motion of the camera CAM between the previous point in time T0 and the current point in time T1. In some examples the time of generating the inertial measurement unit IMU data may not exactly coincide with the time of generating the camera image frames. The inertial measurement unit data may however still represent a motion of the camera CAM between the respective points in time providing the time of generating the inertial measurement unit data substantially coincides with the points in time T0 and T1. In some examples, each camera image frame may be timestamped, and the inertial measurement unit data may be timestamped. The timestamps may be generated by a common clock and correspond to a time at which each image frame is generated and the time at which the inertial measurement unit data is generated. The timestamps may be used to select inertial measurement unit data that is closest in time to the time of generating each image frame. In so doing, the selected inertial measurement unit data may accurately represent the camera motion.

The system SY in FIG. 1 includes a Predict stage and an Update stage. In the Predict stage, a neural network pose prediction $P^{NN}$ and an inertial measurement unit pose prediction $P^{IMU}$ are made. In the Update stage, the neural network pose prediction $P^{NN}$ and the inertial measurement unit pose prediction $P^{IMU}$ are combined in order to estimate the camera pose $P^{CAM}$. In the Predict stage, the system SY in FIG. 1 receives one or more image frames from the sequence of image frames SIF. The one or more image frames received by system SY include the current image frame CIF that is generated at the first point in time T1. In other words, the current image frame CIF corresponds to the first point in time T1. The one or more image frames, including the current image frame CIF, are then inputted to the one or more neural networks NN. The one or more neural networks NN are used to generate a neural network pose prediction $P^{NN}_{T1}$ for the current image frame CIF.

In one example, the neural network pose prediction $P^{NN}_{T1}$ for the current image frame CIF is estimated by inputting the current image frame CIF, i.e. a single image frame, to the neural network NN. In another example the neural network pose prediction $P^{NN}_{T1}$ for the current image frame CIF is estimated by inputting multiple image frames into the neural network NN, i.e. the current image frame CIF, together with one or more additional image frames. The one or more additional image frames may include one or more preceding image frames IFPREC that precede the current image frame CIF, such as the previous image frame PIF corresponding to the previous point in time T0. In this latter example, the neural network pose prediction $P^{NN}_{T1}$ for the current image frame CIF, is generated based on the current image frame CIF and the one or more preceding image frames IFPREC, such as the previous image frame PIF.

The neural network pose prediction $P^{NN}_{T1}$ for the current image frame CIF may be estimated by inputting the current image frame CIF, i.e. a single image frame, into a neural network that is trained in a similar manner to the way in which the human brain determines a pose with respect to a photograph of a room with which they are familiar. For example, given an image of a room that a person is familiar with, the person will readily identify the pose for such an image frame as "position: from the door in the lounge, orientation: looking towards the television". When estimating the camera pose, the neural network NN may employ a camera intrinsic matrix, i.e. a transform that transforms 3D camera coordinates to 2D homogeneous coordinates. The camera intrinsic matrix may include parameters of the camera such as its focal length, its principle point offset and its axis skew.

The neural network pose prediction $P^{NN}_{T1}$ for the current image frame CIF may also be estimated by inputting multiple image frames into a neural network and evaluating a change in pose between image frames. In this respect, a document entitled "Depth Prediction Without the Sensors: Leveraging Structure for Unsupervised Learning from Monocular Videos" by Casser, V. et al., published as arXiv: 1811.06152v1, discloses various neural networks for determining depth maps in order to compute camera ego-motion. Camera ego-motion, i.e. the 3D motion of a camera within an environment, differs from the camera pose per se, but the techniques disclosed in this document may be further exploited in order to estimate a camera pose. This document discloses the use of a fully convolutional encoder-decoder architecture for producing a dense depth map from a single RGB frame. An ego-motion network takes a sequence of two or more RGB image frames as input and produces a transformation matrix between the frames. This document also discloses the use of multiple neural networks for improving ego-motion estimation in the presence of moving objects in the image frames.

Returning to FIG. 1, during the period between the previous point in time T0 and the current point in time T1, the inertial measurement unit IMU generates inertial measurement unit data $IMUDAT_{T0-T1}$ representing a motion of the camera CAM between the previous point in time T0 and the current point in time T1. The inertial measurement unit data $IMUDAT_{T0-T1}$ is received by system SY. System SY also receives the previous camera pose $P^{CAM}_{T0}$ from the system SY. In other words, the previously-estimated camera pose $P^{CAM}_{T0}$ that is estimated by the system SY is fed-back into the system SY.

Subsequently, system SY adjusts the previous camera pose $P^{CAM}_{T0}$ using the inertial measurement unit data $IMUDAT_{T0-T1}$ that represents a motion of the camera between the previous point in time T0 and the current point in time T1, to provide an inertial measurement unit pose prediction $P^{IMU}_{T1}$ for the current point in time T1. System SY may perform the adjustment by transforming the previous camera pose $P^{CAM}_{T0}$ with a pose transformation that is based on the inertial measurement unit data $IMUDAT_{T0-T1}$.

In the Update stage in FIG. 1, the inertial measurement unit pose prediction $P^{IMU}_{T1}$ for the current point in time T1, and the neural network pose prediction $P^{NN}_{T1}$ for the current image frame CIF, are combined to estimate the current camera pose $P^{CAM}_{T1}$ corresponding to the current point in time T1.

The above operations performed by system SY may then be repeated in successive iterations using the current camera pose $P^{CAM}_{T1}$ estimated by each iteration as the previous camera pose $P^{CAM}_{T0}$ for the next iteration.

As illustrated in FIG. 1, in one example, the combining of the inertial measurement unit pose prediction $P^{IMU}_{T1}$ for the current point in time T1, and the neural network pose prediction $P^{NN}_{T1}$ for the current image frame CIF, may be achieved by inputting these values to a non-linear filter NLF. Various non-linear filters may be used for this purpose, including an Extended Kalman Filter, a Modified Polar Extended Kalman Filter, a Marginalized Particle Extended Kalman filter, a Particle Filter, an Unscented Kalman Filter, a Range-Parameterized Extended Kalman filter, and a Cramér-Rao Lower Bound filter.

In some examples, the non-linear filter may be used to improve the accuracy of the camera pose $P^{CAM}$ by performing the filtering based on the respective error values of its inputs.

With reference to FIG. 1, the inertial measurement unit pose prediction $P^{IMU}_{T1}$ for the current point in time T1 includes a first error value $ERR^{IMU}_{T1}$, and the neural network pose prediction $P^{NN}_{T1}$ for the current image frame CIF includes a second error value $ERR^{NN}_{T1}$. In these examples, inputting the inertial measurement unit pose prediction $P^{IMU}_{T1}$ for the current point in time T1, and the neural network pose prediction $P^{NN}_{T1}$ for the current image frame CIF, to a non-linear filter NLF, includes:

using the non-linear filter NLF to filter the inertial measurement unit pose prediction $P^{IMU}_{T1}$ for the current point in time T1, and the neural network pose prediction $P^{NN}_{T1}$ for the current image frame CIF, based on the first error value $ERR^{IMU}_{T1}$ and the second error value $ERR^{NN}_{T1}$.

By filtering based on the respective error values of its inputs, non-linear filter NLF may provide a more accurate pose than might be predicted by the inertial measurement unit pose prediction $P^{IMU}_{T1}$ or the neural network pose prediction $P^{NN}_{T1}$ alone. As indicated in FIG. 1, in some examples, the previous camera pose $P^{CAM}_{T0}$ may also include an error value $ERR^{PCAM}_{T0}$. In these examples, when the previous camera pose $P^{CAM}_{T0}$ is adjusted using the inertial measurement unit data $IMUDAT_{T0-T1}$, the error value $ERR^{CAM}_{T0}$ is incorporated into the first error value $ERR^{IMU}_{T1}$ of the inertial measurement unit pose prediction $P^{IMU}_{T1}$ for the current point in time T1.

In some examples, the above-estimated previous camera pose $P^{CAM}_{T0}$ and the current camera pose $P^{CAM}_{T1}$ camera pose, may be provided with respect to, i.e. respective, the reference coordinate system RCS. This is possible when the camera motion determined by the inertial measurement unit IMU represents motion with respect to the reference coordinate system RCS. The camera pose $P^{CAM}$ that is estimated by system SY may for example be provided respective a local coordinate system, such as $P^{CAM}_{T1}$=Ai+Bj+Ck. The camera pose $P^{CAM}$ that is estimated by system SY may alternatively be provided respective a geographic coordinate system, such as $P^{CAM}_{T1}$=51° 30' 26.463" N 0° 7' 39.93" W, orientation=due North, elevation above the horizon=10°, height above ground level=1 meter.

Figure 2:
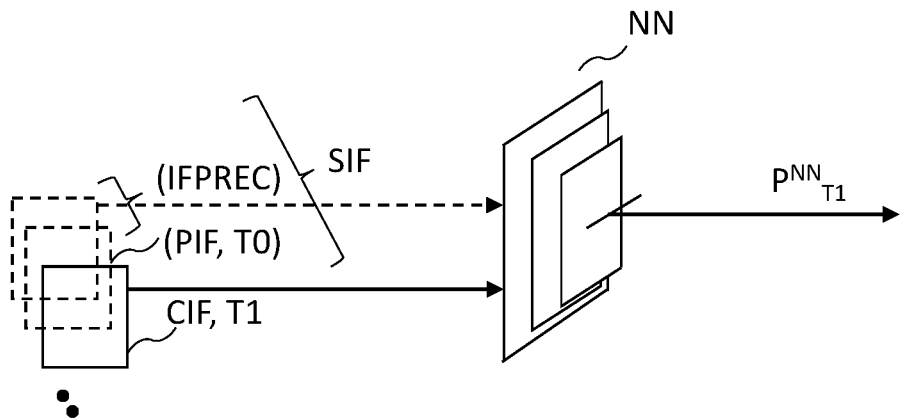
FIG. 2 illustrates a schematic diagram of an example neural network NN for estimating a current camera pose $P^{CAM}_{T1}$ of a camera CAM.

As mentioned above, in some examples a single neural network NN may be used to estimate the camera pose for the image frame(s) generated by camera CAM. FIG. 2 illustrates a schematic diagram of an example neural network NN for estimating a current camera pose $P^{CAM}_{T1}$ of a camera CAM. The neural network NN in FIG. 2 may for example include a Convolutional Neural Network "CNN", or a Recurrent Neural Network "RNN", and so forth. CNNs are particularly suited to image analysis. RNNs are suited to determining differences, and may therefore be used to determine a change in pose between two image frames. In the example illustrated in FIG. 2, the neural network NN generates the neural network pose prediction $P^{NN}_{T1}$ for the current image frame CIF from the sequence of image frames SIF; i.e. based on image data. Neural network NN in FIG. 2 generates the neural network pose prediction $P^{NN}_{T1}$ for the current image frame CIF using the current image frame CIF, and optionally one or more additional, preceding image frames IFPREC, such as the previous image frame PIF. In yet another example (not illustrated in FIG. 2), the neural network NN generates the neural network pose prediction $P^{NN}_{T1}$ for the current image frame CIF based on both pose data and image data. In this latter example, the: inputting the one or more image frames to one or more neural networks NN, includes: inputting pose data corresponding to the current image frame to the one or more neural networks NN. The pose data may be in the form of a depth map of the image frame. A depth map of an image frame includes information relating to the distance of the objects in the frame to the camera. The depth map may for example be generated from the sequence of image frames SIF using a neural network, or using visual odometry techniques, or the depth map may be generated by a so-called "Depth camera". A depth camera, also known as an RGB-D camera or a "Range camera", generates depth information using techniques such as time-of-flight, LIDAR, interferometry, stereo triangulation, by illuminating the scene with "structured light" or an infrared speckle pattern.

Figure 3:
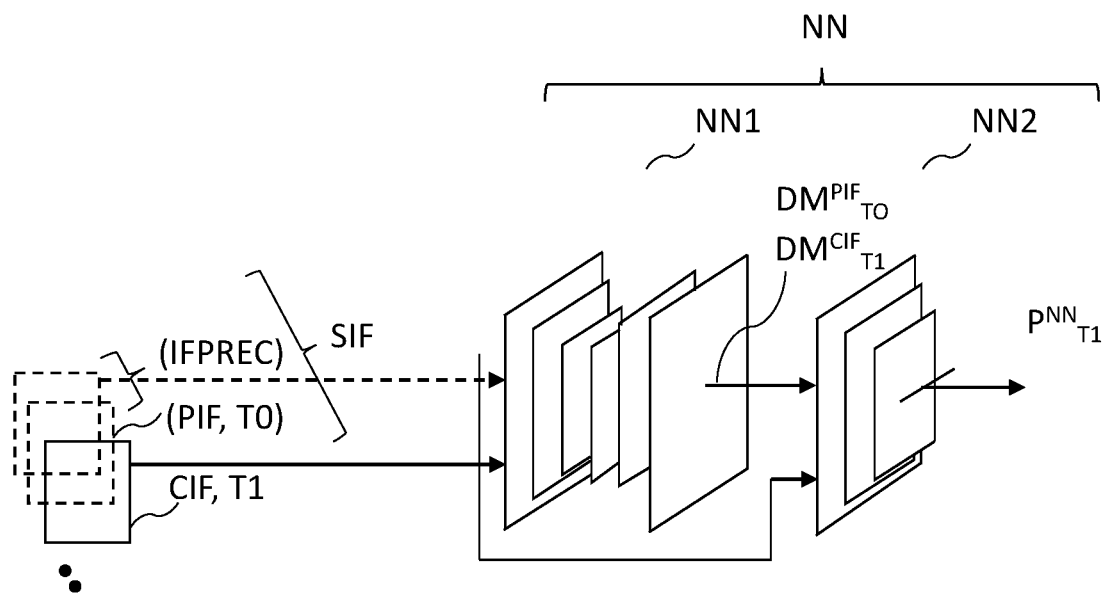
FIG. 3 illustrates a schematic diagram of an example neural network NN that includes a first neural network NN1 that predicts a depth map, and a second neural network NN2 that estimates a pose.
Figure 4:
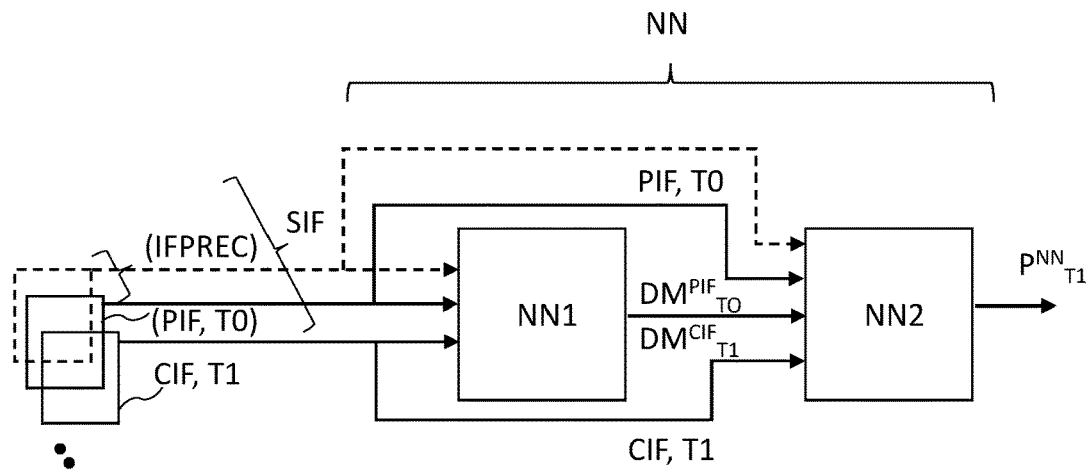
FIG. 4 illustrates in more detail a schematic diagram of an example neural network NN that includes a first neural network NN1 that predicts a depth map, and a second neural network NN2 that estimates a pose.

In some examples, more than one neural network may be employed by system SY. FIG. 3 illustrates a schematic diagram of an example neural network NN that includes a first neural network NN1 that predicts a depth map, and a second neural network NN2 that estimates a pose. In FIG. 3, the sequence of image frames SIF is inputted to the first neural network NN1, and to the second neural network NN2. The first neural network NN1 generates a depth map for each image frame, such as a depth map $DM^{CIF}_{T1}$ for the current image frame at time T1, and a depth map $DM^{PIF}_{T0}$ for the previous image frame at time T0. The depth maps generated by the first neural network NN1 are generated sequentially for each image frame, and then input to the second neural network NN2. After their generation, the depth maps $DM^{PIF}_{T0}$, $DM^{CIF}_{T1}$ may be stored for use at a later point in time. For example, after depth map $DM^{PIF}_{T0}$ is generated at time T0, it may be stored for use at time T1. FIG. 4 illustrates in more detail a schematic diagram of an example neural network NN that includes a first neural network NN1 that predicts a depth map, and a second neural network NN2 that estimates a pose. The items in FIG. 4 corresponds to those in FIG. 3, and the neural network NN in FIG. 4 operates in the same manner as that in FIG. 3. With reference to FIG. 4, in use, the operation of: inputting the one or more image frames to one or more neural networks NN, and generating, using the one or more neural networks NN, a neural network pose prediction $P^{NN}_{T1}$ for the current image frame CIF, includes:

inputting the one or more image frames, including the current image frame CIF and one or more preceding image frames IFPREC, to the first neural network NN1 to generate a depth map $DM^{CIF}_{T1}$ for the current image frame, and a depth map $DM^{PIF}_{T0}$ for each of the one or more preceding image frames;

inputting the depth map $DM^{CIF}_{T1}$ for the current image frame, and the depth map $DM^{PIF}_{T0}$ for the one or more preceding image frames, to the second neural network NN2;

inputting the current image frame CIF and one or more preceding image frames IFPREC to the second neural network NN2; and estimating the neural network pose prediction $P^{NN}_{T1}$ for the current image frame CIF from the second neural network NN2 using the depth map $DM^{CIF}_{T1}$ for the current image frame, and the depth maps $DM^{PIF}_{T0}$ for each of the one or more preceding image frames, and the inputted current image frame CIF and the one or more preceding image frames IFPREC.

As described later, examples of the system SY that generate a depth map using neural network NN may benefit from being able to be trained in an unsupervised manner.

In some examples, the one or more neural networks NN of system SY are trained. In some examples, the one or more neural networks NN are trained to predict a pose. In other examples, a portion of the one or more neural networks, specifically the first neural network NN1, is trained to predict a depth map. In general, training involves setting the parameters, i.e. the weights and biases of the neurons of a neural network, such that the neural network accurately predicts the pose, or the depth map, for a set of training image frames. The training may be supervised, or it may be unsupervised. Supervised training involves setting the parameters of the neural network using training image frames that are previously-labelled with corresponding camera pose or depth map data. By contrast, in unsupervised training, the training image frames are not previously-labelled with corresponding camera pose or depth map data.

In examples in which the one more neural networks are trained to generate a pose, the operations performed by system SY include:

receiving a plurality of training image frames for training the one or more neural networks NN;

inputting the one or more training image frames to the one or more neural networks NN; and training the one or more neural networks NN to perform the: generating, using the one or more neural networks NN, a neural network pose prediction $P^{NN}_{T1}$ for the current image frame CIF.

When supervised training is used to train the one or more neural networks NN to generate a pose, the training involves adjusting the parameters of the neural network such that for each training image frame, a loss function based on a difference between the neural network pose prediction $P^{NN}$, and the training image frame's corresponding previously-labelled camera pose data, meets a stopping criterion. The stopping criterion may for instance be that the output of the loss function is within a predetermined range. In some examples, the corresponding previously-labelled camera pose data of each training image frame is generated whilst generating the training image frames. The training image frames are "labelled" a priori with the camera pose data, and stored for a subsequent training operation. The corresponding camera pose data may for example be generated using a depth camera and/or a depth sensor and/or an inertial measurement unit. Camera pose data for a monocular or binocular camera may be generated in this manner. For example, training image frames may be provided by a binocular or monocular camera, and labelled with corresponding camera pose data that is generated simultaneously using a time-of-flight depth sensor that is rigidly mechanically coupled to the camera. The corresponding camera pose data may be provided with respect to a spatial coordinate system. The spatial coordinate system may be the same coordinate system as the reference coordinate system, or a different coordinate system.

Backpropagation is a technique that may be used to adjust the parameters of the one or more neural networks NN during supervised training. Various algorithms are known for use in backpropagation. Algorithms such as Stochastic Gradient Descent "SGD", Momentum, Adam, Nadam, Adagrad, Adadelta, RMSProp, and Adamax "optimizers" have been developed specifically for this purpose. Essentially, the value of a loss function, such as the mean squared error, or the Huber loss, or the cross entropy, is determined based on a difference between the neural network pose prediction $P^{NN}$, and the corresponding camera pose data for the training image frame. The backpropagation algorithm adjusts the weights and biases in the neural network in order to minimize the value of this loss function until it is within the predetermined range. In SGD, for example, the derivative of the loss function with respect to each weight is computed using the activation function and this is used to adjust each weight.

When unsupervised training is used to train the one or more neural networks to generate a pose, various techniques are contemplated. In one example technique, the training image frames are generated live during the training, and the corresponding camera pose data is provided by analyzing the training image frames using a visual inertial odometry technique. The camera pose data may be computed using a visual inertial SLAM processing pipeline. In this example the training is unsupervised since the training image frames are not previously-labelled with the camera pose data. In this example, the training involves adjusting parameters of the one or more neural networks NN until a loss function based on a difference between the neural network pose prediction $P^{NN}$, and the corresponding camera pose data provided using the visual inertial odometry technique, meets a stopping criterion. The stopping criterion may for instance be that this difference is within a predetermined range.

In some examples, the training image frames used to train neural network NN include corresponding pairs of binocular image frames generated by a binocular camera. The binocular camera includes two optical elements that generate the pairs of image frames. The optical elements have different poses with respect to a scene and thereby provide different views on the same scene. The corresponding pairs of binocular image frames may be used to train the neural network to predict a pose and/or a depth map. The cameras used in such a binocular arrangement may be the same type of camera or different types of camera.

Figure 5:
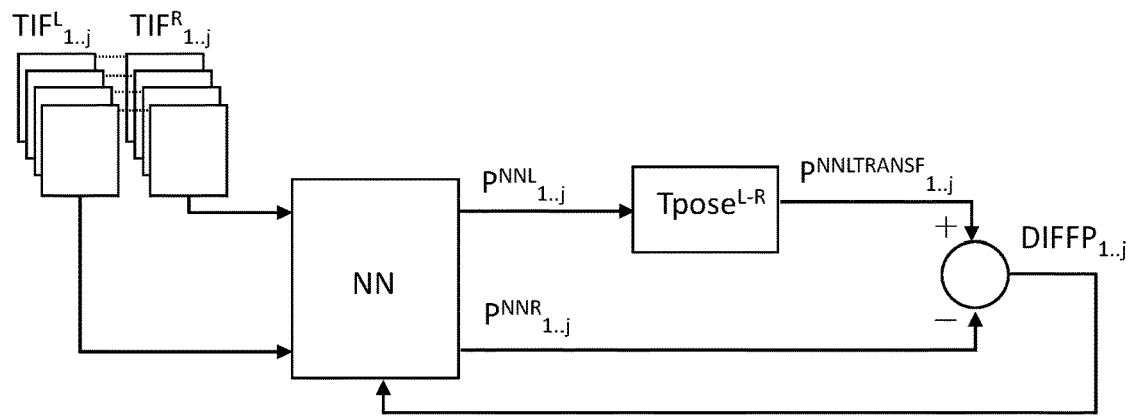
FIG. 5 is a schematic diagram illustrating a first example of training the one or more neural networks NN to predict a pose.

In one example, corresponding pairs of binocular image frames generated by a binocular camera are used to train the one or more neural networks NN to predict a pose. Thereto, FIG. 5 is a schematic diagram illustrating a first example of training the one or more neural networks NN to predict a pose. In this example, the training image frames include corresponding pairs of binocular image frames $TIF^L_{1...j}$, $TIF^R_{1...j}$ generated by a binocular camera. The image frames $TIF^L_{1...j}$, $TIF^R_{1...j}$ are generated simultaneously at times 1 . . . j. One image frame of each pair, $TIF^L_{1...j}$ is generated using a first binocular optical element of the binocular camera, for example a left optical element of a stereoscopic camera, and the other image frame of each pair $TIF^R_{1...j}$ is generated using a second binocular optical element of the binocular camera, for example a right optical element of the stereoscopic camera. The operation of training the one or more neural networks NN to perform the: generating, using the one or more neural networks NN, a neural network pose prediction $P^{NN}_{T1}$ for the current image frame CIF, comprises:

inputting one image frame of each pair $TIF^L_{1...j}$ to the one or more neural networks NN to generate a neural network pose prediction for the one image frame $P^{NNL}_{1...j}$;

inputting the other image frame of each pair to the one or more neural networks NN to generate a neural network pose prediction for the other image frame $P^{NNR}_{1...j}$;

transforming the neural network pose prediction for the one image frame $P^{NNL}_{1...j}$, with a predetermined pose transformation $Tpose^{L-R}$ that maps a pose of the one image frame to a pose of the other image frame, to provide an expected pose for the other image frame $P^{NNLTRANSF}_{1...j}$; and adjusting parameters of the one or more neural networks NN until a loss function based on a difference $DIFFP_{1...j}$ between the expected pose for the other image frame $P^{NNLTRANSF}_{1...j}$, and the generated neural network pose prediction for the other image frame $P^{NNR}_{1...j}$, satisfies a stopping criterion.

The predetermined pose transformation $Tpose^{L-R}$ that maps a pose of the one image frame to a pose of the other image frame may be determined using the known mutual pose relationship of the binocular optical elements of the binocular camera. The predetermined pose transformation $Tpose^{L-R}$ may for instance be represented by a matrix, or another transformation. For example, the predetermined pose transformation may include a matrix that represents a pose transformation in the form of a 20 degree angular rotation and a 5 centimeter translation in a particular plane, the 20 degrees and 5 centimeters representing the angular and spatial difference between the two binocular optical elements. The loss function may for example be determined using the above-mentioned mean squared error, or the Huber loss, or the cross entropy. The stopping criterion may for instance be that the difference $DIFFP_{1...j}$ is within a predetermined range.

Using the pairs of binocular image frames in this manner allows the one or more neural networks NN to be trained in an unsupervised manner. This obviates the need to collect large amounts of pose data when generating the training image frames. This simplifies the process of obtaining training data, and also permits training to be performed in a user-specific environment, thereby improving the specificity of the trained neural network to that environment.

Figure 6:
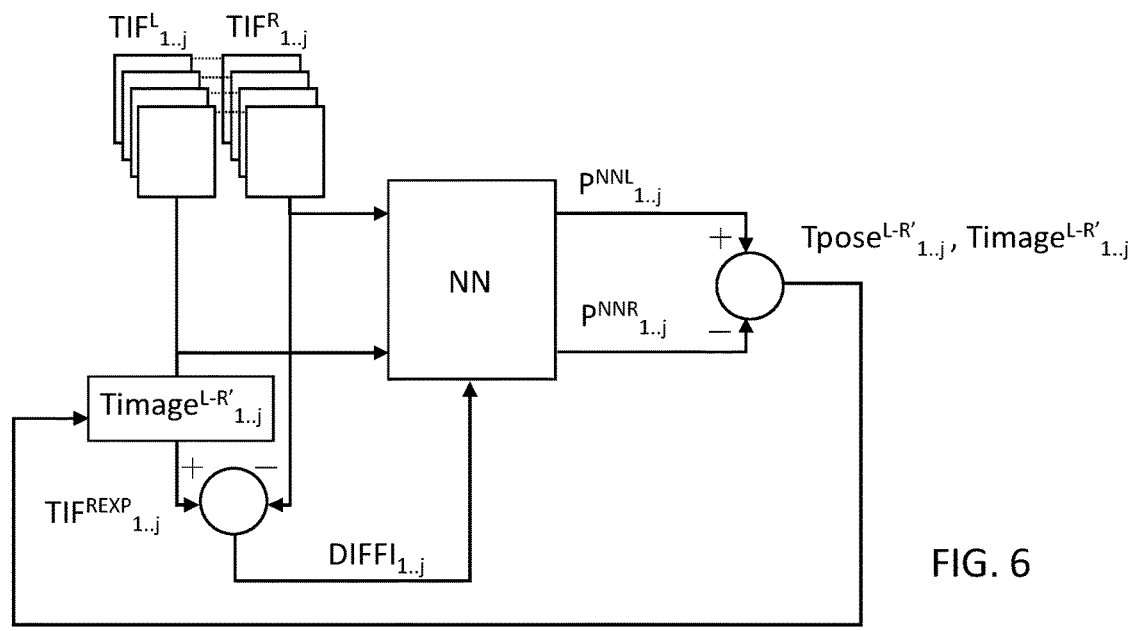
FIG. 6 is a schematic diagram illustrating a second example of training the one or more neural networks NN to predict a pose.

Another example of using corresponding pairs of binocular image frames generated by a binocular camera to train the one or more neural networks NN to predict a pose, is illustrated with reference to FIG. 6. FIG. 6 is a schematic diagram illustrating a second example of training the one or more neural networks NN to predict a pose. In this example, the training image frames again include corresponding pairs of binocular image frames $TIF^L_{1...j}$, $TIF^R_{1...j}$ generated by a binocular camera. Each pair of binocular image frames is generated simultaneously. One image frame of each pair $TIF^L_{1...j}$ is generated using a first binocular optical element of the binocular camera, and the other image frame of each pair $TIF^R_{1...j}$ is generated using a second binocular optical element of the binocular camera. Training the one or more neural networks NN to perform the: generating, using the one or more neural networks NN, a neural network pose prediction $P^{NN}_{T1}$ for the current image frame CIF, comprises:

inputting one image frame of each pair $TIF^L_{1...j}$ to the one or more neural networks NN to generate a neural network pose prediction for the one image frame $P^{NNL}_{1...j}$;

inputting the other image frame of each pair to the one or more neural networks NN to generate a neural network pose prediction for the other image frame $P^{NNR}_{1...j}$;

computing a pose transformation $Tpose^{L-R'}_{1...j}$ that maps the neural network pose prediction for the one image frame $P^{NNL}_{1...j}$ to the neural network pose prediction for the other image frame $P^{NNR}_{1...j}$;

computing an image transformation $Timage^{L-R'}_{1...j}$ corresponding to the pose transformation $TP^{NNLR'}_{T1}$;

transforming the one image frame of each pair $TIF^L_{1...j}$, with the computed image transformation $Timage^{L-R'}_{1...j}$, to provide an expected image frame for the other image frame of each pair $TIF^{REXP}_{1...j}$; and adjusting parameters of the one or more neural networks NN until a loss function based on a difference $DIFFI_{1...j}$ between the expected image for the other image frame $TIF^{REXP}_{1...j}$, and the other image frame of each pair $TIF^{R}_{1...j}$, satisfies a stopping criterion.

In this example the loss function is determined in the image domain. It therefore contrasts with the previous example in which the loss function is determined in the pose domain. In this example, when the neural network NN correctly predicts the pose for each pair of images $TIF^{L}_{1...j}$, $TIF^{R}_{1...j}$, the image transformation $Timage^{L-R}_{1...j}$ will accurately map the one image frame of each pair $TIF^{L}_{1...j}$ to the other image frame of each pair $TIF^{R}_{1...j}$. The loss function may be determined using the mean squared error, or the Huber loss, or the cross entropy. The stopping criterion may for instance be that the difference $DIFFI_{1...j}$ is within a predetermined range. Again, using the pairs of binocular image frames in this manner allows the one or more neural networks NN to be trained in an unsupervised manner.

In another example, corresponding pairs of binocular image frames generated by a binocular camera are used to train the one or more neural networks NN to predict a depth map. The or more neural networks NN may for example be those represented in FIG. 3 or FIG. 4, which include a first neural network NN1 that predicts a depth map. In this example, the portion of the one or more networks NN represented by the first neural network NN1, is trained to predict a depth map. In this example, the operations performed by system SY include:

receiving a plurality of training image frames for training the first neural network NN1 to predict a depth map;

wherein the plurality of training image frames include corresponding pairs of binocular image frames $TIF^{L}_{1...j}$, $TIF^{R}_{1...j}$ generated by a binocular camera; each pair of binocular image frames being generated simultaneously, and wherein one image frame of each pair $TIF^{L}_{1...j}$ is generated using a first binocular optical element of the binocular camera, and wherein the other image frame of each pair $TIF^{R}_{1...j}$ is generated using a second binocular optical element of the binocular camera; and training the first neural network NN1 to predict a depth map by, for each pair of binocular image frames $TIF^{L}_{1...j}$, $TIF^{R}_{1...j}$:

inputting the one image frame of each pair $TIF^{L}_{1...j}$ and/or the other image frame of each pair $TIF^{R}_{1...j}$, to the first neural network NN1 to generate a predicted depth map;

generating a disparity map from each pair of binocular image frames $TIF^{L}_{1...j}$, $TIF^{R}_{1...j}$ to provide a second depth map; and adjusting parameters of the first neural network NN1 until a loss function based on a difference between the predicted depth map, and the second depth map, satisfies a stopping criterion.

The disparity map may be considered to provide a reliable second depth map for each pair of image frames. Thus, in this example, the first neural network's parameters are adjusted until close agreement is reached between the depth map predicted by the first neural network NN1, and the second depth map that is generated from the disparity map. The loss function may be determined using the mean squared error, or the Huber loss, or the cross entropy. The stopping criterion may for instance be that the difference is within a predetermined range. Again, using the pairs of binocular image frames in this manner allows the one or more neural networks NN to be trained in an unsupervised manner.

In another example, the one or more neural networks NN are trained in a supervised manner using training image frames from a monocular camera. The training image frames include corresponding depth maps that are generated by a depth sensor. The or more neural networks may for example be those represented in FIG. 3 or FIG. 4, which include a first neural network NN1 that predicts a depth map. In this example, the portion of the one or more networks NN represented by the first neural network NN1, is trained to predict a depth map. In this example, the operations performed by system SY include:

receiving a plurality of training image frames for training the first neural network NN1 to predict a depth map;

wherein the plurality of training image frames include a sequence of training image frames generated by a monocular camera; each training image frame including a corresponding depth map generated by a depth sensor; and training the first neural network NN1 to predict a depth map by:

inputting each training image frame to the first neural network NN1 to generate a predicted depth map for the training image frame; and adjusting parameters of the first neural network NN1 until a loss function based on a difference between the predicted depth map, and the corresponding depth map generated by a depth sensor, satisfies a stopping criterion.

The depth sensor may for example be a time-of-flight depth sensor, a structured light camera, or a stereo camera. The stopping criterion may for instance be that the difference is within a predetermined range. In other words, the depth map predicted by the first neural network NN1 is sufficiently close to the depth map generated by the depth sensor. The loss function may be determined as described above for the previous example.

In general, the operations of system SY, may be implemented by one or more central processing units, i.e. a "CPU", and/or one or more graphics processing units, i.e. a "GPU", and/or one or more neural processors. For example, the operations of system SY, including the: generating, using the one or more neural networks NN, a neural network pose prediction $P^{NN}_{T1}$ for the current image frame CIF, a process termed "inference" in relation to a trained neural network, may be implemented by one or more CPUs and/or one or more GPUs and/or one or more neural processors. In some examples, one or more operations described in relation to the neural network NN may be implemented by one or more neural processors. The operations implemented by one or more neural processors may for example include the generating, using the one or more neural networks NN, a neural network pose prediction $P^{NN}_{T1}$ for the current image frame CIF, and/or the training the one or more neural networks NN to perform the: generating, using the one or more neural networks NN, a neural network pose prediction $P^{NN}_{T1}$ for the current image frame CIF and/or the training the first neural network NN1 to predict a depth map. Thus, as illustrated in the example of FIG. 1, the system SY includes a neural processor NPU that performs the operations of neural network NN. A neural processor, also known as a neural processing unit, a neural network accelerator and an AI accelerator, may be used to accelerate a machine learning algorithm. By including specialized electronic circuitry designed for one or more specified neural network architectures, neural processors process input data, such as image data, more efficiently than general purpose processors. In some examples therefore, the one or more processors PROC may include one or more neural processors NPU, the one or more neural processors are configured to execute instructions that cause the system SY to perform the:
 generating, using the one or more neural networks NN, a neural network pose prediction $P^{NN}_{T1}$ for the current image frame CIF.

Examples of the system SY that include one or more neural processors for this purpose may offer efficient processing of the sequence of image frames SIF. Moreover, by performing these operations using a neural processor rather than a general purpose processing unit such as a central processing units CPU or a graphics processing units GPU, the constraints on the general purpose processing unit are alleviated. This leaves the general purpose processing unit free to perform other processing in a more efficient manner.

In some examples, it is contemplated that the one or more processors PROC include one or more central processing units CPU and/or one or more graphics processing units GPU, and the one or more central processing units CPU and/or the one or more graphics processing units GPU are configured to execute instructions that cause the system SY to perform the:
 receiving one or more image frames from the sequence of image frames SIF, including a current image frame CIF corresponding to the current point in time T1; and/or the
 receiving inertial measurement unit data $IMUDAT_{T0-T1}$ representing a motion of the camera CAM between the previous point in time T0 and the current point in time T1; and/or the
 receiving the previous camera pose $P^{CAM}_{T0}$; and/or the
 inputting the one or more image frames to one or more neural networks NN; and/or the
 adjusting the previous camera pose $P^{CAM}_{T0}$ using the inertial measurement unit data $IMUDAT_{T0-T1}$ representing a motion of the camera between the previous point in time T0 and the current point in time T1, to provide an inertial measurement unit pose prediction $P^{IMU}_{T1}$ for the current point in time T1; and/or the
 combining the inertial measurement unit pose prediction $P^{IMU}_{T1}$ for the current point in time T1, and the neural network pose prediction $P^{NN}_{T1}$ for the current image frame CIF, to estimate the current camera pose $P^{CAM}_{T1}$.

In some examples, the system SY may further include the camera CAM and/or the inertial measurement unit IMU. Where included in system SY, the inertial measurement unit IMU is held in a fixed spatial relationship with the camera CAM. The inertial measurement unit generates the inertial measurement unit data $IMUDAT_{T0-T1}$ representing a motion of the camera CAM between the previous point in time T0 and the current point in time T1. The camera may be movable within a reference coordinate system RCS. Thus, the inertial measurement unit data $IMUDAT_{T0-T1}$ represents a motion of the camera CAM respective the reference coordinate system RCS. In so doing, the current camera pose $P^{CAM}_{T1}$ may be estimated respective the reference coordinate system RCS.

In another example, a computer-implemented method is provided. The computer-implemented method may be used with the system SY described above, and therefore may include the same functionality as was described in relation to system SY. For brevity, not all details of the system SY are duplicated here in relation to the method. The method may be provided as a non-transitory computer-readable storage medium comprising a set of computer-readable instructions stored thereon which, when executed by at least one processor, cause the at least one processor to perform the method. In other words, the above-described methods may be implemented as a computer program product. The computer program product can be provided by dedicated hardware or hardware capable of running the software in association with appropriate software. When provided by a processor, these functions can be provided by a single dedicated processor, a single shared processor, or multiple individual processors that some of the processors can share. Moreover, the explicit use of the terms "processor" or "controller" should not be interpreted as exclusively referring to hardware capable of running software, and can implicitly include, but is not limited to, digital signal processor "DSP" hardware, read only memory "ROM" for storing software, random access memory "RAM", a non-volatile storage device, and the like. Furthermore, examples of the present disclosure can take the form of a computer program product accessible from a computer usable storage medium or a computer readable storage medium, the computer program product providing program code for use by or in connection with a computer or any instruction execution system. For the purposes of this description, a computer-usable storage medium or computer-readable storage medium can be any apparatus that can comprise, store, communicate, propagate, or transport a program for use by or in connection with an instruction execution system, apparatus, or device. The medium can be an electronic, magnetic, optical, electromagnetic, infrared, or semiconductor system or device or device or propagation medium. Examples of computer readable media include semiconductor or solid state memories, magnetic tape, removable computer disks, random access memory "RAM", read only memory "ROM", rigid magnetic disks, and optical disks. Current examples of optical disks include compact disk-read only memory "CD-ROM", optical disk-read/write "CD-R/W", Blu-Ray™, and DVD.

Figure 7:
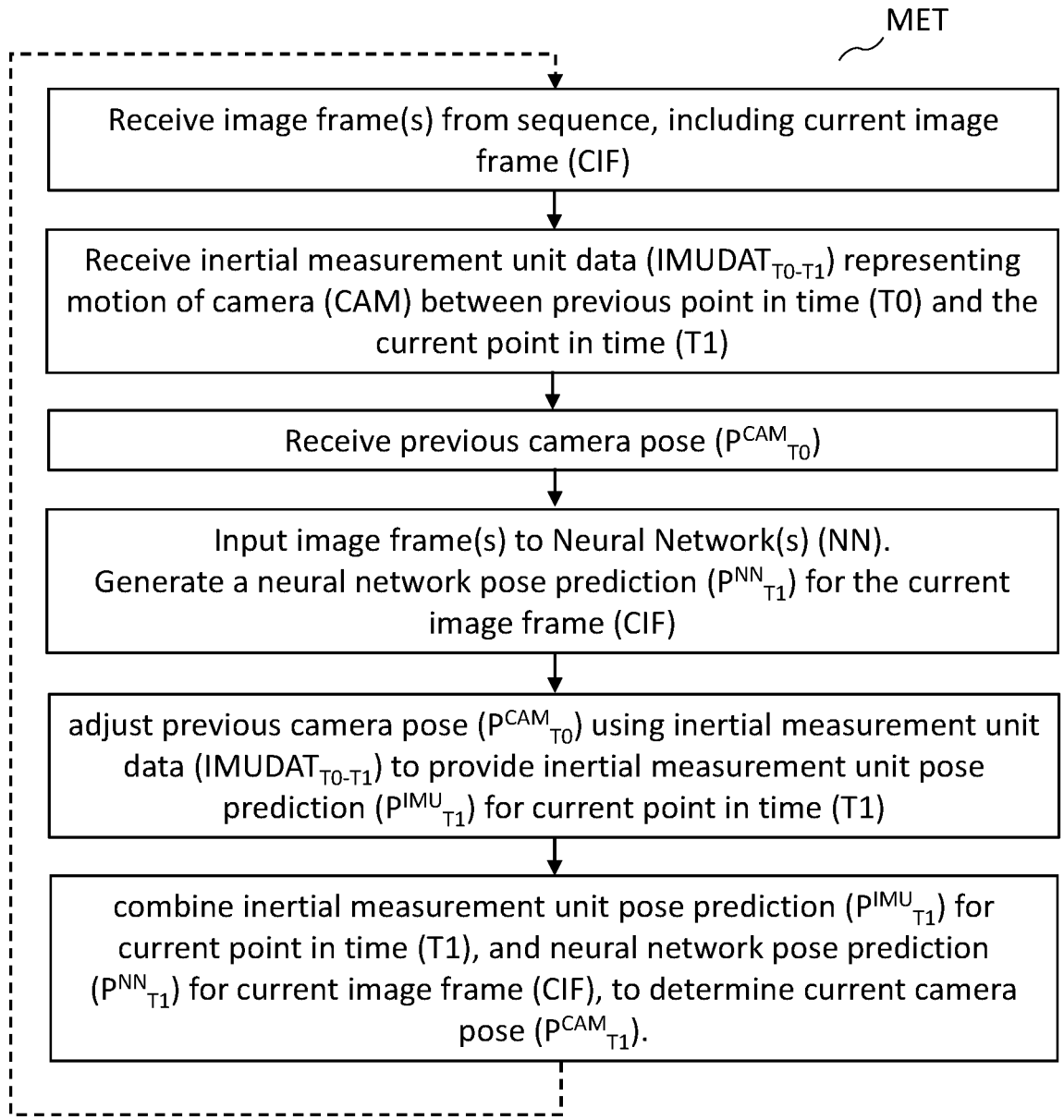
FIG. 7 illustrates a flowchart of an example computer-implemented method MET of estimating a current camera pose $P^{CAM}_{T1}$ of a camera CAM.

FIG. 7 illustrates a flowchart of an example computer-implemented method MET of estimating a current camera pose $P^{CAM}_{T1}$ of a camera CAM. The camera CAM is configured to generate a sequence of image frames SIF. The current camera pose $P^{CAM}_{T1}$ corresponds to a current point in time T1 and is estimated using a previous camera pose $P^{CAM}_{T0}$ corresponding to a previous point in time T0. The computer-implemented method includes:
 receiving, by one or more processors PROC, one or more image frames from the sequence of image frames SIF, including a current image frame CIF corresponding to the current point in time T1;
 receiving, by the one or more processors PROC, inertial measurement unit data $IMUDAT_{T0-T1}$ representing a motion of the camera CAM between the previous point in time T0 and the current point in time T1;
 receiving, by the one or more processors PROC, the previous camera pose $P^{CAM}_{T0}$;
 inputting, by the one or more processors PROC, the one or more image frames to one or more neural networks NN, and generating, using the one or more neural networks NN, a neural network pose prediction $P^{NN}_{T1}$ for the current image frame CIF;
 adjusting, by the one or more processors PROC, the previous camera pose $P^{CAM}_{T0}$ using the inertial measurement unit data $IMUDAT_{T0-T1}$ representing a motion of the camera between the previous point in time T0 and the current point in time T1, to provide an inertial measurement unit pose prediction $P^{IMU}_{T1}$ for the current point in time T1; and combining, by the one or more processors PROC, the inertial measurement unit pose prediction $P^{IMU}_{T1}$ for the current point in time T1, and the neural network pose prediction $P^{NN}_{T1}$ for the current image frame CIF, to estimate the current camera pose $P^{CAM}_{T1}$.

Other operations described in relation to the system SY may also be provided in the method. For example, the computer-implemented method may also include the training operations described above in relation to the system SY.

The computer-implemented method may be provided as a non-transitory computer-readable storage medium encoded with instructions executable by one or more processors PROC for estimating a current camera pose $P^{CAM}_{T1}$ corresponding to a current point in time T1 using a previous camera pose $P^{CAM}_{T0}$ corresponding to a previous point in time T0, of a camera CAM configured to generate a sequence of image frames SIF. The computer-readable storage medium includes instructions to:

receive, by one or more processors PROC, one or more image frames from the sequence of image frames SIF, including a current image frame CIF corresponding to the current point in time T1;

receive, by the one or more processors PROC, inertial measurement unit data $IMUDAT_{T0-T1}$ representing a motion of the camera CAM between the previous point in time T0 and the current point in time T1;

receive, by the one or more processors PROC, the previous camera pose $P^{CAM}_{T0}$;

input, by the one or more processors PROC, the one or more image frames to one or more neural networks NN, and generating, using the one or more neural networks NN, a neural network pose prediction $P^{NN}_{T1}$ for the current image frame CIF;

adjust, by the one or more processors PROC, the previous camera pose $P^{CAM}_{T0}$ using the inertial measurement unit data $IMUDAT_{T0-T1}$ representing a motion of the camera between the previous point in time T0 and the current point in time T1, to provide an inertial measurement unit pose prediction $P^{IMU}_{T1}$ for the current point in time T1; and combine, by the one or more processors PROC, the inertial measurement unit pose prediction $P^{IMU}_{T1}$ for the current point in time T1, and the neural network pose prediction $P^{NN}_{T1}$ for the current image frame CIF, to estimate the current camera pose $P^{CAM}_{T1}$.

Other operations described in relation to the system SY may also be provided as instructions on the non-transitory computer-readable storage medium.

The above examples are to be understood as illustrative examples of the present disclosure. Further examples are also envisaged. For example, the examples described in relation to system SY may also be provided by the computer-implemented method, or by the computer program product or by the computer readable storage medium. It is therefore to be understood that a feature described in relation to any one example may be used alone, or in combination with other features described, and may also be used in combination with one or more features of another of the examples, or a combination of other the examples. Furthermore, equivalents and modifications not described above may also be employed without departing from the scope of the disclosure, which is defined in the accompanying claims. Any reference signs in the claims should not be construed as limiting the scope of the disclosure.

What is claimed is:

1. A system for estimating a current camera pose corresponding to a current point in time using a previous camera pose corresponding to a previous point in time, of a camera configured to generate a sequence of image frames, the system comprising:
   one or more processors; and
   one or more non-transitory computer-readable storage media that collectively store instructions that, when executed by the one or more processors cause the system to perform operations, comprising:
   receiving one or more image frames from the sequence of image frames, including a current image frame corresponding to the current point in time;
   receiving inertial measurement unit data representing a motion of the camera between the previous point in time and the current point in time;
   receiving the previous camera pose;
   inputting the one or more image frames to one or more neural networks, and generating, using the one or more neural networks, a neural network pose prediction for the current image frame;
   adjusting the previous camera pose using the inertial measurement unit data representing a motion of the camera between the previous point in time and the current point in time, to provide an inertial measurement unit pose prediction for the current point in time; and
   combining the inertial measurement unit pose prediction for the current point in time, and the neural network pose prediction for the current image frame, to estimate the current camera pose.

2. The system according to claim 1, wherein the operations are repeated in successive iterations using the current camera pose estimated by each iteration as the previous camera pose for the next iteration.

3. The system according to claim 1, wherein the receiving one or more image frames from the sequence of image frames comprises: receiving one or more preceding image frames that precede the current image frame, including a previous image frame corresponding to the previous point in time; and comprising:
   inputting the one or more preceding image frames to the one or more neural networks;
   and wherein the generating, using the one or more neural networks, a neural network pose prediction for the current image frame, is based on the current image frame and the one or more preceding image frames.

4. The system according to claim 1, wherein the: combining the inertial measurement unit pose prediction for the current point in time, and the neural network pose prediction for the current image frame, to estimate the current camera pose, comprises:
   inputting the inertial measurement unit pose prediction for the current point in time, and the neural network pose prediction for the current image frame, to a non-linear filter.

5. The system according to claim 4, wherein the inertial measurement unit pose prediction for the current point in time comprises a first error value, and wherein the neural network pose prediction for the current image frame comprises a second error value, and wherein the: inputting the inertial measurement unit pose prediction for the current point in time, and the neural network pose prediction for the current image frame, to a non-linear filter, comprises:
   using the non-linear filter to filter the inertial measurement unit pose prediction for the current point in time, and the neural network pose prediction for the current image frame, based on the first error value and the second error value.

6. The system according to claim 4, wherein the non-linear filter is selected from the group: an Extended Kalman Filter, a Modified Polar Extended Kalman Filter, a Marginalized Particle Extended Kalman filter, a Particle Filter, an Unscented Kalman Filter, a Range-Parameterized Extended Kalman filter, a Cramer-Rao Lower Bound filter.

7. The system according to claim 1, wherein the one or more neural networks comprises a first neural network configured to predict a depth map, and a second neural network configured to estimate a pose;

and wherein the inputting the one or more image frames to one or more neural networks, and generating, using the one or more neural networks, a neural network pose prediction for the current image frame, comprises:

inputting the one or more image frames, including the current image frame and one or more preceding image frames, to the first neural network to generate a depth map for the current image frame, and a depth map for each of the one or more preceding image frames;

inputting the depth map for the current image frame, and the depth map for the one or more preceding image frames, to the second neural network;

inputting the current image frame and one or more preceding image frames to the second neural network; and estimating the neural network pose prediction for the current image frame from the second neural network using the depth map for the current image frame, and the depth maps for each of the one or more preceding image frames, and the inputted current image frame and the one or more preceding image frames.

8. The system according to claim 1, wherein the one or more non-transitory computer-readable storage media that collectively store instructions that, when executed by the one or more processors cause the system to perform operations, comprising:

receiving a plurality of training image frames for training the one or more neural networks;

wherein the plurality of training image frames are previously labelled with corresponding camera pose data representing a camera pose for each of the plurality of training image frames, or wherein the plurality of training image frames are not previously labelled with corresponding camera pose data representing a camera pose for each of the plurality of training image frames; and inputting the one or more training image frames to the one or more neural networks; and training the one or more neural networks to perform the: generating, using the one or more neural networks, a neural network pose prediction for the current image frame.

9. The system according to claim 8, wherein the training image frames are generated live during the training the one or more neural networks, and wherein the corresponding camera pose data is provided by analyzing the training image frames using a visual inertial odometry technique.

10. The system according to claim 8, wherein the plurality of training image frames include corresponding pairs of binocular image frames generated by a binocular camera; each pair of binocular image frames being generated simultaneously, and wherein one image frame of each pair is generated using a first binocular optical element of the binocular camera, and wherein the other image frame of each pair is generated using a second binocular optical element of the binocular camera; and wherein the training the one or more neural networks to perform the: generating, using the one or more neural networks, a neural network pose prediction for the current image frame, comprises:

inputting one image frame of each pair to the one or more neural networks to generate a neural network pose prediction for the one image frame;

inputting the other image frame of each pair to the one or more neural networks to generate a neural network pose prediction for the other image frame;

transforming the neural network pose prediction for the one image frame, with a predetermined pose transformation that maps a pose of the one image frame to a pose of the other image frame, to provide an expected pose for the other image frame; and adjusting parameters of the one or more neural networks until a loss function based on a difference between the expected pose for the other image frame, and the generated neural network pose prediction for the other image frame, satisfies a stopping criterion.

11. The system according to claim 8, wherein the plurality of training image frames include corresponding pairs of binocular image frames generated by a binocular camera; each pair of binocular image frames being generated simultaneously, and wherein one image frame of each pair is generated using a first binocular optical element of the binocular camera, and wherein the other image frame of each pair is generated using a second binocular optical element of the binocular camera; and wherein the training the one or more neural networks to perform the: generating, using the one or more neural networks, a neural network pose prediction for the current image frame, comprises:

inputting one image frame of each pair to the one or more neural networks to generate a neural network pose prediction for the one image frame;

inputting the other image frame of each pair to the one or more neural networks to generate a neural network pose prediction for the other image frame;

computing a pose transformation that maps the neural network pose prediction for the one image frame to the neural network pose prediction for the other image frame;

computing an image transformation corresponding to the pose transformation;

transforming the one image frame of each pair, with the computed image transformation, to provide an expected image frame for the other image frame of each pair; and adjusting parameters of the one or more neural networks until a loss function based on a difference between the expected image for the other image frame, and the other image frame of each pair, satisfies a stopping criterion.

12. The system according to claim 7, wherein the one or more non-transitory computer-readable storage media that collectively store instructions that, when executed by the one or more processors cause the system to perform operations, comprising:

receiving a plurality of training image frames for training the first neural network to predict a depth map;

wherein the plurality of training image frames include corresponding pairs of binocular image frames generated by a binocular camera; each pair of binocular image frames being generated simultaneously, and wherein one image frame of each pair is generated using a first binocular optical element of the binocular camera, and wherein the other image frame of each pair is generated using a second binocular optical element of the binocular camera; and training the first neural network to predict a depth map by, for each pair of binocular image frames:

inputting the one image frame of each pair and/or the other image frame of each pair, to the first neural network to generate a predicted depth map;

generating a disparity map from each pair of binocular image frames to provide a second depth map; and adjusting parameters of the first neural network until a loss function based on a difference between the predicted depth map, and the second depth map, satisfies a stopping criterion.

13. The system according to claim 7, wherein the one or more non-transitory computer-readable storage media that collectively store instructions that, when executed by the one or more processors cause the system to perform operations, comprising:

receiving a plurality of training image frames for training the first neural network to predict a depth map;

wherein the plurality of training image frames include a sequence of training image frames generated by a monocular camera; each training image frame including a corresponding depth map generated by a depth sensor; and training the first neural network to predict a depth map by:

inputting each training image frame to the first neural network to generate a predicted depth map for the training image frame; and adjusting parameters of the first neural network until a loss function based on a difference between the predicted depth map, and the corresponding depth map generated by a depth sensor, satisfies a stopping criterion.

14. The system according to claim 1, wherein the one or more processors comprises one or more neural processors, and wherein the one or more neural processors are configured to execute instructions that cause the system to perform the:

generating, using the one or more neural networks, a neural network pose prediction for the current image frame.

15. The system according to claim 14, wherein the one or more processors comprises one or more central processing units and/or one or more graphics processing units, and wherein the one or more central processing units and/or the one or more graphics processing units are configured to execute instructions that cause the system to perform the:

receiving one or more image frames from the sequence of image frames, including a current image frame corresponding to the current point in time; and/or the receiving inertial measurement unit data representing a motion of the camera between the previous point in time and the current point in time; and/or the receiving the previous camera pose; and/or the inputting the one or more image frames to one or more neural networks; and/or the adjusting the previous camera pose using the inertial measurement unit data representing a motion of the camera between the previous point in time and the current point in time, to provide an inertial measurement unit pose prediction for the current point in time; and/or the combining the inertial measurement unit pose prediction for the current point in time, and the neural network pose prediction for the current image frame, to estimate the current camera pose.

16. The system according to claim 1, comprising a camera; and wherein the camera is configured to generate the sequence of image frames.

17. The system according to claim 16, comprising an inertial measurement unit;

wherein the inertial measurement unit is held in a fixed spatial relationship with the camera; and wherein the inertial measurement unit is configured to generate the inertial measurement unit data representing a motion of the camera.

18. The system according to claim 1, wherein the camera is movable within a reference coordinate system; and wherein the inertial measurement unit data represents a motion of the camera respective the reference coordinate system such that the current camera pose is estimated respective the reference coordinate system.

19. Computer-implemented method of estimating a current camera pose corresponding to a current point in time using a previous camera pose corresponding to a previous point in time, of a camera configured to generate a sequence of image frames, the method comprising:

receiving, by one or more processors, one or more image frames from the sequence of image frames, including a current image frame corresponding to the current point in time;

receiving, by the one or more processors, inertial measurement unit data representing a motion of the camera between the previous point in time and the current point in time;

receiving, by the one or more processors, the previous camera pose;

inputting, by the one or more processors, the one or more image frames to one or more neural networks, and generating, using the one or more neural networks, a neural network pose prediction for the current image frame;

adjusting, by the one or more processors, the previous camera pose using the inertial measurement unit data representing a motion of the camera between the previous point in time and the current point in time, to provide an inertial measurement unit pose prediction for the current point in time; and combining, by the one or more processors, the inertial measurement unit pose prediction for the current point in time, and the neural network pose prediction for the current image frame, to estimate the current camera pose.

20. A non-transitory computer-readable storage medium encoded with instructions executable by one or more processors for estimating a current camera pose corresponding to a current point in time using a previous camera pose corresponding to a previous point in time, of a camera configured to generate a sequence of image frames, the computer-readable storage medium comprising instructions to:

receive, by one or more processors, one or more image frames from the sequence of image frames, including a current image frame corresponding to the current point in time;

receive, by the one or more processors, inertial measurement unit data representing a motion of the camera between the previous point in time and the current point in time;

receive, by the one or more processors, the previous camera pose;

input, by the one or more processors, the one or more image frames to one or more neural networks, and generating, using the one or more neural networks, a neural network pose prediction for the current image frame;

adjust, by the one or more processors, the previous camera pose using the inertial measurement unit data representing a motion of the camera between the previous point in time and the current point in time, to provide an inertial measurement unit pose prediction for the current point in time; and combine, by the one or more processors, the inertial measurement unit pose prediction for the current point in time, and the neural network pose prediction for the current image frame, to estimate the current camera pose.

* * * * *